Dec. 20, 1927.
W. E. WINE
SIDE BEARING
Filed May 5, 1925
1,653,077
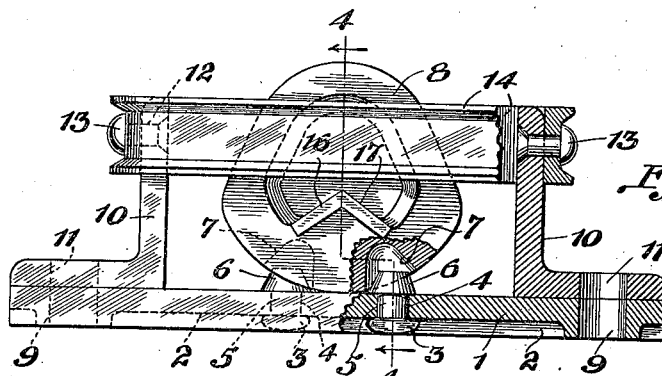
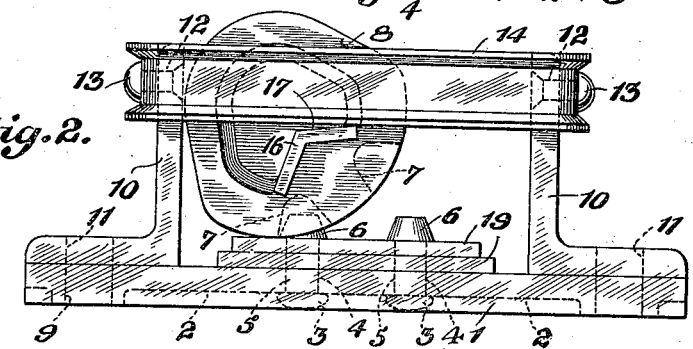
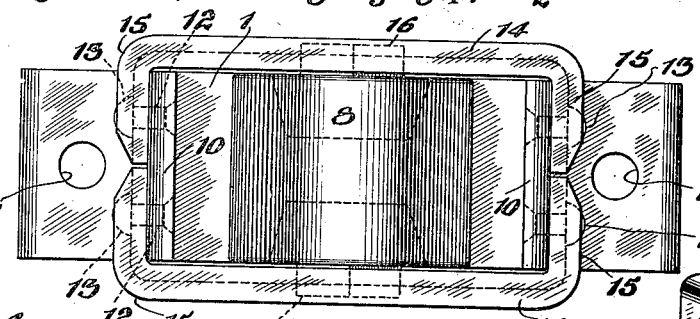
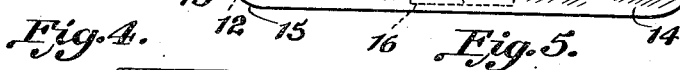
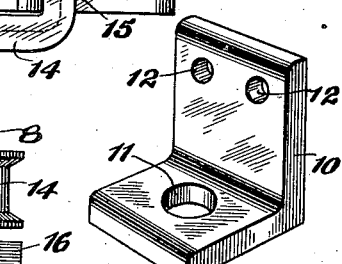
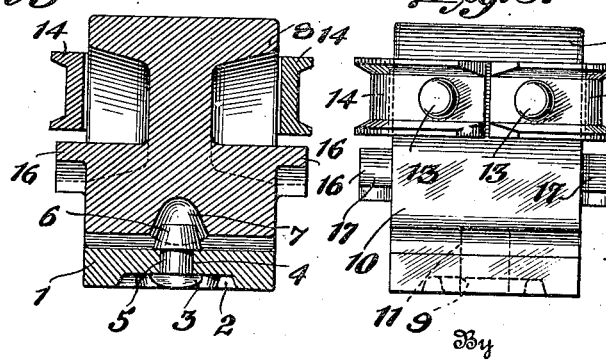
Inventor
William E. Wine
By Parker Cook
Attorney Patented Dec. 20, 1927.

1,653,077

UNITED STATES PATENT OFFICE.

WILLIAM E. WINE, OF TOLEDO, OHIO.

SIDE BEARING.

Application filed May 5, 1925. Serial No. 28,081.

My invention relates to new and useful improvements in side bearings, and more particularly to a roller side bearing of the self-centering type, and has for an object to provide a side bearing wherein the housing consists of but a base plate and two angles, the said angles being tied by two straps which straps also cooperate with the roller to hold the same within the housing.

I prefer to pass two rivets through the bottom plate of the housing which are designed to fit within small pockets in the bottom of the roller as this arrangement prevents any shifting of the roller within the housing.

Still another object of the invention is to provide a housing which is made of but few parts, quickly and readily assembled and extremely light in weight.

Still another object of the invention is to provide a roller side bearing comprising a housing made up of two end plates in the form of angles about which are placed two straps and to place within the housing a roller bearing having trunnions which extend outwardly beyond the side straps so that it will be impossible for the rollers to be removed or lost from the housing.

Still another object of the invention is to provide a side bearing which will be very economical in construction, readily assembled, and at the same time strong enough to withstand the hard usages incident to a roller side bearing.

With these and other objects in view, the invention consists in certain new and novel arrangements and combination of parts as will be hereinafter more fully described and pointed out in the claims.

Referring now to the drawings showing a preferred and a modified form of my invention—

Fig. 1 is a side elevation of my improved side-bearing, a part thereof being shown in section;

Fig. 2 is a side elevation of a slightly modified form, plates being shown in the bottom of the housing for the purpose of elevating the roller;

Fig. 3 is a top plan view, the dotted lines showing the coring of the roller and the trunnions;

Fig. 4 is vertical sectional view taken on line 4—4 of Fig. 1;

Fig. 5 is an end view of the housing, and

Fig. 6 is a perspective of one of the end plates of the housing.

Referring now more particularly to the several views, there is shown a rectangular base plate 1, which may be cored as at 2, and through this base plate are the bores or openings 4 through which will be passed the rivets 5, the lower heads 3 of the rivets abutting against the bottom surface of the plate 2, while the conical shaped heads 6 are adapted to act as teeth and fit within small depressions 7 formed in the bottom of the roller 8, which roller will be shortly described in detail.

At the opposite ends of the plate 1 are the two openings or holes 9, and on these opposite ends are positioned the two metal angles or brackets 10, an opening 11 being formed respectively in each angle to register with the holes 9. Through these feet of the angles and ends of the plate 1 will be passed bolts (not shown) to secure the side bearing to the truck or body bolster as the case may be.

Referring to Fig. 6 for the moment, showing one of the angles 10, it will be noticed that there are also two holes 12 formed in the upper leg which holes are adapted to receive rivets 13 which rivets in turn are designed to extend through and secure the two straps 14 about the two angles or brackets as may be seen in Fig. 3. These straps 14 are bent at their opposite ends as at 15, and are, of course, provided with holes for the reception of the rivets 13 so that the housing in its completed form is box-like but open at its sides as may be seen in Figs. 1 and 2.

These straps 14 may be channel bars so that the rivet heads will be flush with the outer legs of the channel or they may be metal straps of other configuration, but they must be of such thickness as to provide the necessary strength and arranged so that the lower edge of each strap will act as a means for retaining the roller within the housing. This is accomplished by forming the roller 8 with the small outwardly extending trunnions 16 which are substantially of a broad V-shape or anticlinal, as may be seen in Figs. 1 and 2 at 17, thus providing a surface which is nearly parallel with the strap when the roller is at either of its limits of movement.

Of course, the position of the trunnions with relation to the horizontal plane of the lower edge of the straps must be such that the roller is free to rock between certain limits, that is, from one end of the housing to the other, but at each extremity the trunnions will contact with the straps. In other words, the roller is securely locked within the housing, but free to rock within certain limits.

The roller may be cored as at 18 for lightness, and is provided with the small pockets 7 in its bottom surface as heretofore mentioned. The roller otherwise is of the well known standard "Wine type", the arc of the lower surface being greater than the arc of the top of the bearing and the center of gravity so located that the roller will normally assume an upright position.

In the modified form the same arrangement is shown as in the preferred form with the exception that two plates 19 are placed on the base plate 1 to thus elevate the roller and this arrangement makes it a relatively simple matter to cut off the rivet heads and place new plates within the housing when the old ones become worn.

The assembling of the bearing is comparatively simple. The rivets will first have been placed within the base plate 1, and the straps may then be riveted to the two end plates. When the bearing is to be placed on the body bolster the base plate will be laid in position, the roller then placed on the base plate and then the angles which have already been strapped to each other will be placed over the roller, and the base plate and the angles will then be tightly bolted to the body bolster. After the bearing is so positioned, the roller will be held within the housing as the trunnions will impinge against the bottom of the straps if the roller were lifted.

It is understood that at times housings are secured in their upright position, and at times they are secured to the body bolster in their inverted position, but in either instance, the roller will be held within the housing.

From the foregoing it will be seen that the side bearing as a whole is comparatively simple, and the housing may be made up of standard angles and a standard channel may be cut and bent, it only being necessary to cast the roller and stamp or cast the base plate.

It will also be understood that any other desirable form of roller might be substituted in which would be a pin or on which there would be trunnions which would extend outwardly beyond the edge of the straps so that the roller would not be dropped from the housing when inverted.

It will also be seen that there is no waste metal and that the bearing is one which is extremely simple in construction, easily assembled and efficient in service.

Having thus described my invention, what I claim as new and desire to secure by Letters Patent is:—

1. A housing for a side bearing comprising a base member provided with a wear plate secured thereto, a frame separably mounted on said base member, said frame having angle iron ends and channel bar sides secured to said angle iron ends.

2. A housing for a side bearing comprising a base member having a wear plate secured on the upper surface thereof, a separable frame mounted on said base, said frame comprising two like angle iron brackets oppositely positioned, side straps secured at the upper ends of said angle iron brackets forming a rectangular enclosure.

3. A side bearing comprising a base plate, a wear plate mounted on said base plate, two like oppositely positioned angle iron brackets secured to said base, two straps riveted to the upper ends of said angle iron brackets adapted to form a rectangular enclosure for a roller.

In testimony whereof I affix my signature.

WILLIAM E. WINE.